UNITED STATES PATENT OFFICE.

WILLIAM H. NORDABY, OF GERMANTOWN, NEW YORK, ASSIGNOR OF ONE-HALF OF HIS RIGHT TO EDMOND ROCKERFELLER, OF SAME PLACE.

COMPOUND FOR REMOVING PAINT AND VARNISH.

SPECIFICATION forming part of Letters Patent No. 224,841, dated February 24, 1880.

Application filed October 12, 1878.

*To all whom it may concern:*

Be it known that I, WILLIAM H. NORDABY, of Germantown, in the county of Columbia and State of New York, have invented a new and useful Compound for Removing Paint and Varnish, when Old and Dried, from Wood or Metal Surfaces, which compound is fully described in the following specification.

This invention relates to a compound for removing old and dried paint and varnish from surfaces of wood, metal, stone, &c.; and it consists in a composition formed of lime and sal-soda dissolved in water and aqua-ammonia and creosote.

To produce my improved compound, take twenty pounds of lime (oxide of lime) and dissolve the same in five gallons of soft or rain water. Take, also, twenty pounds of sal-soda and dissolve the same in another five gallons of soft or rain water. Then thoroughly mix the said two solutions together, after which add to the whole quantity of mixed lime and soda solutions one and one-quarter fluid pound of aqua-ammonia and ten fluid ounces of creosote, and stir the same in the whole body of lime and soda solutions until they are thoroughly mixed and incorporated therewith. The compound will then be ready for use, though, when permitted to stand for some length of time tightly covered or inclosed, it will operate better with the paint or varnish to be removed.

When the above-mentioned ingredients are mixed in or about in the proportions named the carbonate of soda is decomposed by the carbonic acid which it contains uniting with the lime to form carbonate of lime, and the soda being left as a hydrate or caustic soda. This latter, being a liquid, is mixed with the former to produce a pasty mass. The ammonia is, by the action of the lime, made caustic, and becomes an active agent for dissolving the dried oils in the paint and varnish, while the creosote, being a solvent of gums and resins and resinous elements, acts powerfully on the gums and resins in the varnish to be removed, so that the caustic alkali before named may more readily saponify them.

In using this compound I stir the same well before applying it, so that the settled portions will be thoroughly mixed with the fluid portions.

In applying this compound to the paint or varnish to be removed, I use a brush or swab of sponge, cloth, or other material, and coat the entire surface of the paint or varnish. The compound is then permitted to remain in its pasty form until it appears to have become dried.

One application will soften and saponify the varnish down to the paint beneath, and, if it is desired to remove the varnish only, I then remove the softened varnish and the adhering solid and dried portions of the compound and wash the surfaces thoroughly to remove the alkaline matter which may remain; but if it is desired to remove the paint beneath as well as the varnish, I apply a second coat of the compound over the first and dried coat, and permit the second coat to dry the same as the first coat, after which the paint may be readily removed by means of a putty-knife after the coating has been wetted by water, and when the paint has been removed I wash the surface well with water to remove the remains of the alkali therefrom.

When dry the surfaces may be repainted the same as new surfaces usually are.

The solid portion of the compound is of great advantage, as by it the surface may receive a heavier coating of the active elements than if the liquid portions only were used, as the said solid portions operate mechanically to hold the liquid portions in a larger quantity and for a longer time on either level, rounded, or vertical surfaces than the liquid portions would be held were they only used.

Having described my invention, what I claim is—

A compound for removing paint or varnish composed of lime, sal-soda, aqua-ammonia, and creosote in the proportions described, for the purposes set forth.

WILLIAM H. NORDABY.

Witnesses:
ALEX. SELKIRK,
CHARLES SELKIRK.